Patented Nov. 29, 1949

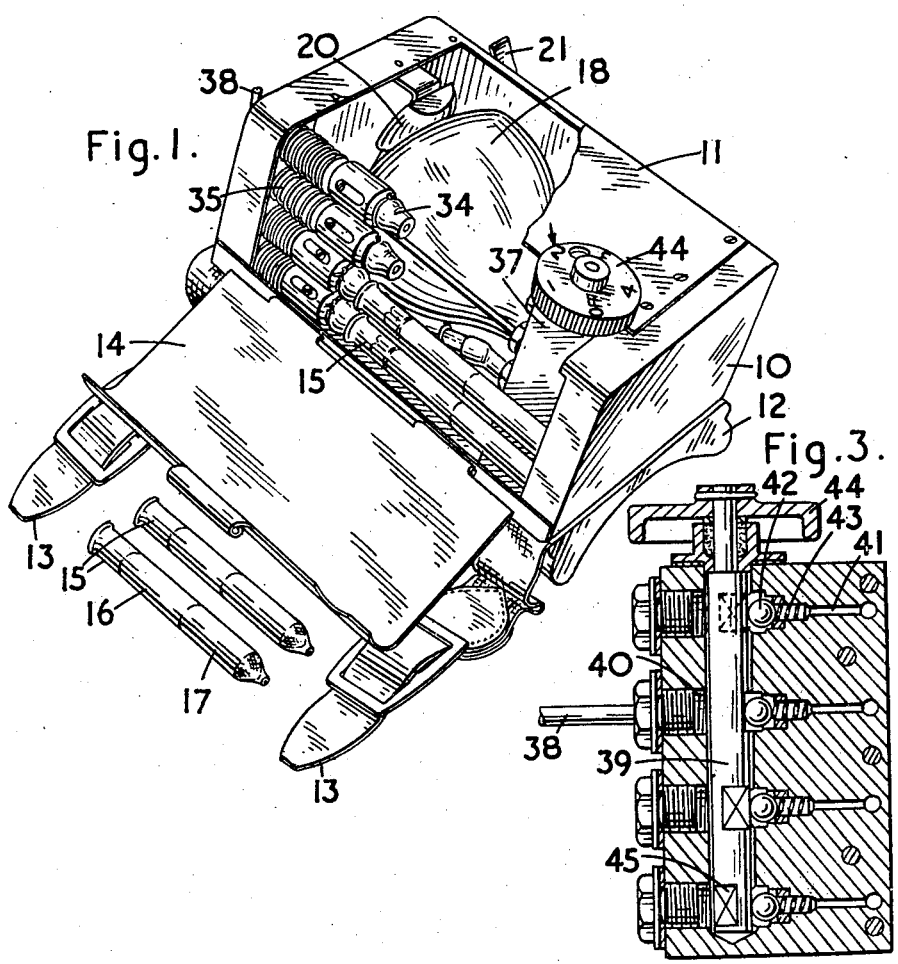

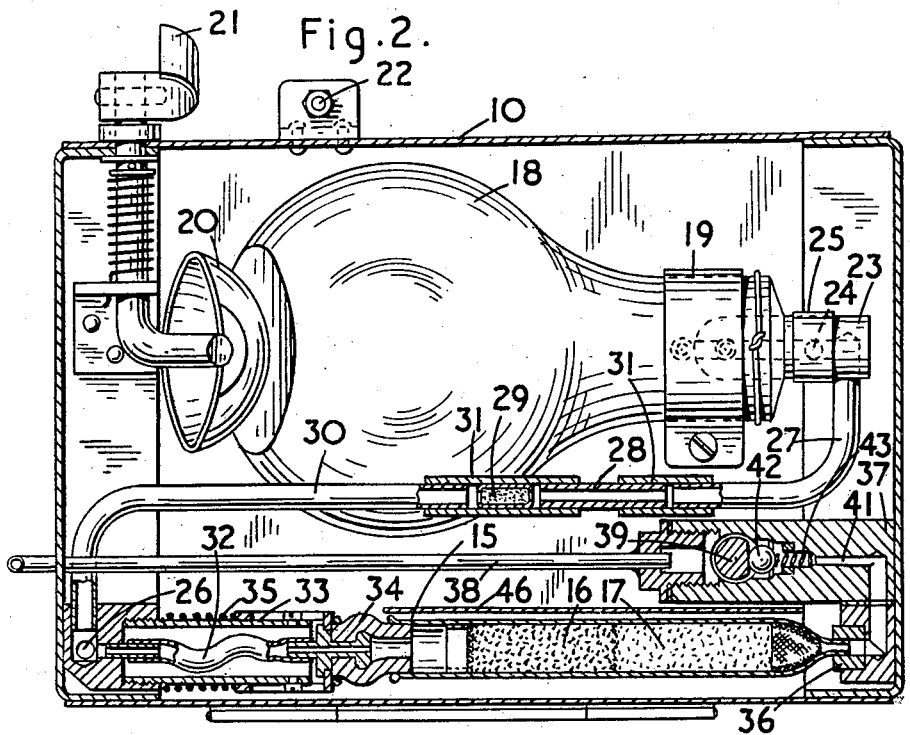

2,489,654

UNITED STATES PATENT OFFICE 2,489,654

APPARATUS FOR COLORIMETRIC GAS INVESTIGATION

John David Main-Smith, Sidney Arthur Dodd, James Sim, Herbert Anson Lyon, George Henry Hillier, and George Alan Earwicker, Farnborough, England, assignors to the Minister of Supply in His Majesty's Government of the United Kingdom of Great Britain and Northern Ireland, London, England Application May 8, 1945, Serial No. 592,632
In Great Britain February 21, 1945

7 Claims. (Cl. 23—254)

1

The invention relates to apparatus for colorimetric gas investigation (including both qualitative and quantitative investigation) and more particularly to the type of apparatus in which a sample of the gas under investigation is passed through a tube (hereinafter termed a detector tube) enclosing material which undergoes colour change when brought into contact with the ingredient to be detected or to be estimated quantitatively.

In accordance with the invention, such apparatus comprises gas induction means connected to the atmosphere surrounding the apparatus through alternative gas flow channels each adapted for interposition therein of a detachable detector tube, and selector valve means on the atmospheric side of said detector tubes whereby all said flow channels may be shut off from the atmosphere or any selected flow channel may be caused to communicate therewith.

The apparatus may conveniently comprise two manifolds each having two or more branches extending towards corresponding branches on the other manifold, each of said branches terminating in an element adapted to locate one end of a detector tube, one of said manifolds being connected to the gas induction means and the other being open to the atmosphere and associated with a selector valve.

The apparatus according to the invention may conveniently be made in a self-contained portable form in which the gas induction means, manifolds and detector tubes are located inside a casing which may conveniently be provided with straps to secure it to the body of the user, so that it may be used for example for investigating the atmosphere at different points in the interior of vehicles or aircraft by a member of the crew leaving his hands free.

When the apparatus is to be employed for quantitative investigations, the gas induction means must be arranged to draw substantially the same volume of gas through the apparatus at each actuation; a simple and convenient form of gas induction means is a rubber bulb, which may be compressed by a pad operated by a lever extending outside the casing and having an end stop to limit positively the movement thereof.

A portable apparatus, suitable for both qualitative and quantitative investigations is illustrated by way of example in the accompanying drawing, in which Fig. 1 is a perspective view of the apparatus with a part of the casing broken away to show the internal parts, Fig. 2 is a sectional plan showing one gas flow channel and Fig. 3 is a longitudinal section through the selector valve.

Referring to the drawing, the apparatus comprises, as shown in Fig. 1, a casing 10 closed by a top plate 11 and having curved brackets 12 and straps 13 whereby the apparatus may, for example, be strapped to the leg of the pilot of an aircraft. A hinged lid 14 is provided on the front of the casing whereby four detector tubes 15 may be inserted in position and changed after use. Fig. 1 shows two detector tubes in position and two removed. The detector tubes each comprise a cylindrical tube drawn out at one end into a nozzle, and enclosing a colorimetric indicator material 16 such for example as a material for detecting carbon monoxide comprising palladous sulphite or a complex salt or mixture containing the palladous and sulphite radicals, and which may advantageously be covered with a column 17 of an absorbent material such as silica gel to protect the detecting substance from disturbing effects of other impurities, such as hydrocarbon vapours which may be contained in the atmosphere under investigation.

Referring now to Figs. 1 and 2, the casing contains a rubber bulb 18 held therein by a clamp 19, and arranged to be compressed by a pad 20 carried by one arm of a pivoted spring biassed lever passing through the casing 10 and terminating in a handle 21 whose movement to compress the bulb 18 is limited by a stop 22. Sealed into the neck of the bulb 18 is a tube 23 with a transverse port 24 covered by a rubber sleeve 25. The port 24 and sleeve 25 constitute a one-way valve of a simple type, since when the bulb 18 is compressed by actuating the lever 21, the sleeve 25 will stretch and allow air to be expelled through the port 24, while when the pressure is released on the bulb 18, the sleeve 25 will tighten and prevent ingress of air through the port 24. Connected to the tube 23 is a duct leading to a manifold 26 and composed of sections 27, 28, 29, 30 connected by rubber sleeves 31. The sections 27 and 30 are ordinary thin walled glass or metal tubes. Section 28 is a thick walled capillary tube which may be of glass or metal, and which controls to a suitably low rate the flow of air into the bulb 18 when the handle 21 is released after the bulb has been compressed. The section 29 is a tubular housing containing filter material such as cotton, wool or other cellulose or other fibre. The manifold 26 has four branches each comprising a flexible tube 32 located within a telescopic housing 33 which terminates in a rubber spigot 34 and which is urged to its extended position by a coiled compression spring 35. Facing each rubber spigot 34 is a corresponding rubber socket 36 which is adapted to receive and locate the nozzle end of a detector tube 15, the other end of which is located by the spigot 34.

Each socket 36 forms an element terminating a branch of a manifold located in a housing 37, and which communicates with the atmosphere through a selector valve and an inlet tube 38 extending through the casing 10.

The housing 37 with its associated manifold and selector valve is shown in longitudinal section in Fig. 3 and in cross section in Fig. 2. The housing 37 is bored to receive a rotatable spindle 39 which has a clearance fit in the bore, so that the annular passage between the spindle 39 and the bore constitutes a manifold. A transverse passage 40 provides communication between the bore containing spindle 39 and the atmospheric inlet tube 38. Four transverse ports 41 are provided on the opposite side of the spindle 39 and form branches terminating in the sockets 36. Each port 41 has an enlarged mouth near its junction with the bore of the housing 37 and contains a ball 42 backed by a compression spring 43. The spindle 39 is rotatable by a knob 44 and has four recesses 45 cut in it so disposed that by rotation of the spindle any one of the balls 42 may be brought opposite a recess and be moved by its spring 43 to open the mouth of the corresponding port 41, or all the balls 42 may be held by the spindle against their springs 43 closing the mouths of the corresponding ports 41. The knob 44 is engraved to denote the position of the valve which it controls and the top plate 11 is provided with a corresponding datum mark indicated by an arrow in Fig. 1. It will be observed that in Fig. 3 it is the second port 41 from the top which is open, while in Fig. 2 the section has been taken through the port which is open.

In operation of the apparatus, the detector tubes are first inserted and the selector valve rotated to select an appropriate gas flow channel. The handle 21 is next operated until it makes contact with the limit stop 22, air exhausting from the bulb 18 through the port 24. When the handle 21 is released it returns under its spring bias and the bulb recovers, drawing gas from the atmosphere through the selected gas flow channel including the interposed detector tube 15, the rate of gas flow being suitably controlled by the capillary tube 28.

The presence in the atmosphere of the ingredient to be detected e. g. carbon monoxide, is indicated by colour change in the filling 16 of the detector tubes, and the content of such ingredient is estimated by measurement of the length of the column over which such colour change has occurred. For convenience in observing the tubes a background plate 46 may be provided as shown in Fig. 2: such background plate is not shown in Fig. 1. In the use of the apparatus it is often convenient to join to the tube 38 a small bored extension tube so that the atmosphere may be tested at several points without necessitating the operator changing his position.

It will be appreciated that the apparatus enables several investigations to be made successfully without adjustment of parts other than the selector valve and that the positioning of the selector valve on the atmospheric side of the detector tubes protects the detector tubes against ingress of the surrounding gases except when a tube has been selected for use.

We claim:

1. Apparatus for colorimetric gas investigation comprising means forming a plurality of gas flow channels normally cut off from communication with the atmosphere surrounding the apparatus, each of said channels including a removable detector tube, gas induction means connected to said channels for producing therethrough a unidirectional flow of gas from the atmosphere when said channels are open to the atmosphere, and means for selectively controlling communication between said channels and the atmosphere including a valve housing having a plurality of ports each connected to one of said channels and a connection to the atmosphere, a plurality of valves in said housing each controlling communication between one of said ports and the atmospheric connection, and a single selector member controlling the positions of all of said valves, said member being movable to various positions and so constructed and arranged that in each position it either maintains all of said valves in closed position or selectively opens one of said valves to connect its associated port and channel to the atmosphere.

2. Apparatus for colorimetric gas investigation comprising means forming a plurality of gas flow channels normally cut off from communication with the atmosphere surrounding the apparatus, including a removable detector tube in each channel, a valve housing having ports communicating with said channels, a connection to the atmosphere and valves controlling communication between said ports and the atmospheric connection, a manifold having a plurality of branches each connected to one of said channels, said detector tubes being located between said valve housing and said manifold, gas induction means connected to said manifold for producing a unidirectional flow of gas from the atmosphere through said channels when the channels are open to the atmosphere, and means for selectively controlling communication between said channels and the atmosphere including a single selector member associated with said valve housing controlling the positions of all of said valves, said member being movable to various positions and so constructed and arranged that in each position it either maintains all of said valves in closed position or selectively opens one of said valves to permit the flow of gas through its associated port and channel.

3. Apparatus for colorimetric gas investigation comprising means forming a plurality of gas flow channels normally cut off from communication with the atmosphere surrounding the apparatus, including a removable detector tube in each channel, gas induction means connected to said channels for producing therethrough a unidirectional flow of gas from the atmosphere when said channels are open to the atmosphere, a valve housing having a bore connected to the atmosphere and a plurality of ports each communicating with said bore and with one of said channels, a plurality of valves in said housing controlling communication between said ports and the bore, and a single selector member controlling the positions of all of said valves including a rotatable spindle extending into said bore, and means on said spindle at different portions of its periphery for either maintaining all of said valves in closed position or selectively opening one valve at a time to permit the flow of gas through its associated port and channel.

4. Apparatus for colorimetric gas investigation comprising means forming a plurality of gas flow channels normally cut off from communication with the atmosphere surrounding the apparatus, including a removable detector tube in each channel, a valve housing having a plurality of valves each controlling communication between one of said channels and a connection to the atmosphere, a manifold having a plurality of branches each connected to one of said channels, said detector tubes being positioned between said valve housing and said manifold, gas induction means connected to said manifold for producing a unidirectional flow of gas from the atmosphere through said channels when said channels are open to the atmosphere, and a single selector member comprising a rotatable spindle extending into said housing and having means thereon for selectively controlling the positions of said valves.

5. Apparatus for colorimetric gas investigation comprising means forming a plurality of gas flow channels normally cut off from communication with the atmosphere surrounding the apparatus, including a removable detector tube in each channel, gas induction means connected to said channels for producing therethrough a unidirectional flow of gas from the atmosphere when said channels are open to the atmosphere, a valve housing having a connection to the atmosphere and a plurality of valves each controlling communication between one of said channels and the atmospheric connection, means on said housing adapted to receive one end of each of said detector tubes, a manifold connected to said gas induction means, a flexible element supported by said manifold and adapted to receive the other end of each of said detector tubes, and a rotatable spindle extending into said housing and having means thereon for selectively controlling the positions of said valves.

6. In an apparatus for colorimetric gas investigation of the type embodying a plurality of gas flow channels each adapted to include a removable detector tube and normally cut off from communication with the atmosphere surrounding the apparatus, the combination of gas induction means connected to said channels for producing therethrough a unidirectional flow of gas from the atmosphere when said channels are open to the atmosphere, and means for selectively controlling communication between said channels and the atmosphere including a valve housing having a plurality of ports each connected to one of said channels and a connection to the atmosphere, a plurality of valves in said housing each controlling communication between one of said ports and the atmosphere connection, and a single selector member controlling the positions of all the said valves, said member being movable to various positions and so constructed and arranged that in each position it either maintains all of said valves in closed position or selectively opens one of said valves to connect its associated port and channel to the atmosphere.

7. In an apparatus for colorimetric gas investigation of the type embodying a plurality of gas flow channels each adapted to include a removable detector tube and normally cut off from communication with the atmosphere surrounding the apparatus, the combination of gas induction means connected to said channels for producing therethrough a unidirectional flow of gas from the atmosphere when said channels are open to the atmosphere, a valve housing having a bore connected to the atmosphere and a plurality of ports each communcating with said bore and with one of said channels, a plurality of valves in said housing controlling communication between said ports and the bore, and a single selector member controlling the positions of all of said valves including a rotatable spindle extending into said bore, and means on said spindle at different portions of its periphery for either maintaining all of said valves in closed position or selectively opening one valve at a time to permit the flow of gas through its associated port and channel.

JOHN DAVID MAIN-SMITH.
SIDNEY ARTHUR DODD.
JAMES SIM.
HERBERT ANSON LYON.
GEORGE HENRY HILLIER.
GEORGE ALAN EARWICKER.

REFERENCES CITED

The following references are of record in the file of this patent:

UNITED STATES PATENTS

| Number | Name | Date |
|---|---|---|
| 605,991 | Bleier | June 21, 1898 |
| 1,448,901 | Moreland | Mar. 20, 1923 |
| 2,018,441 | Edelmann | Oct. 22, 1935 |
| 2,147,607 | McMillan et al. | Feb. 14, 1939 |
| 2,234,499 | McAllister | Mar. 11, 1941 |
| 2,333,934 | Jacobson | Nov. 9, 1943 |

FOREIGN PATENTS

| Number | Country | Date |
|---|---|---|
| 433,979 | Great Britain | Aug. 23, 1935 |
| 522,942 | Great Britain | July 2, 1940 |